Dec. 16, 1947.   A. M. JACOBSEN   2,432,900
ELECTRICAL DYNAMOMETER
Filed Nov. 1, 1944
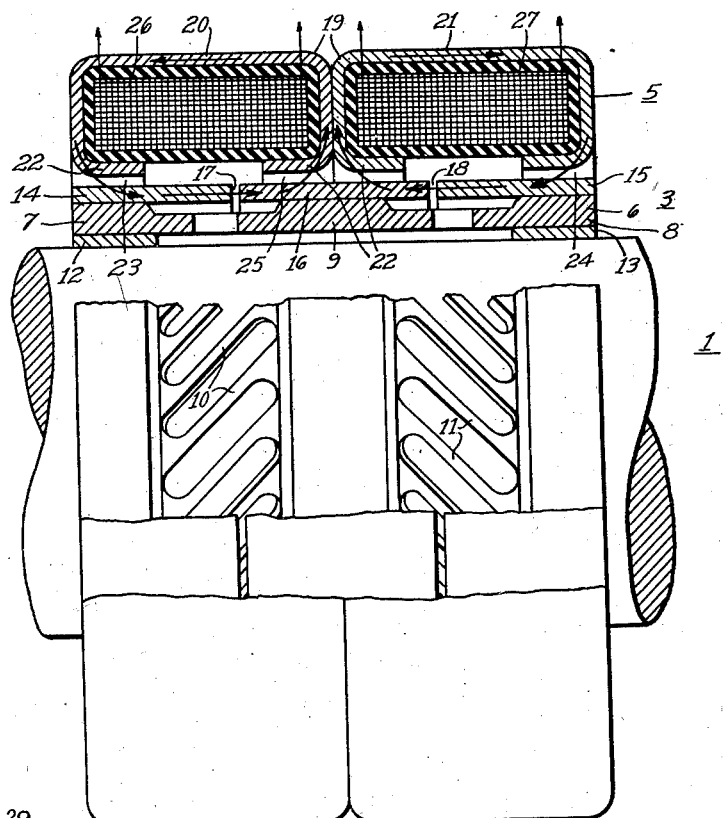
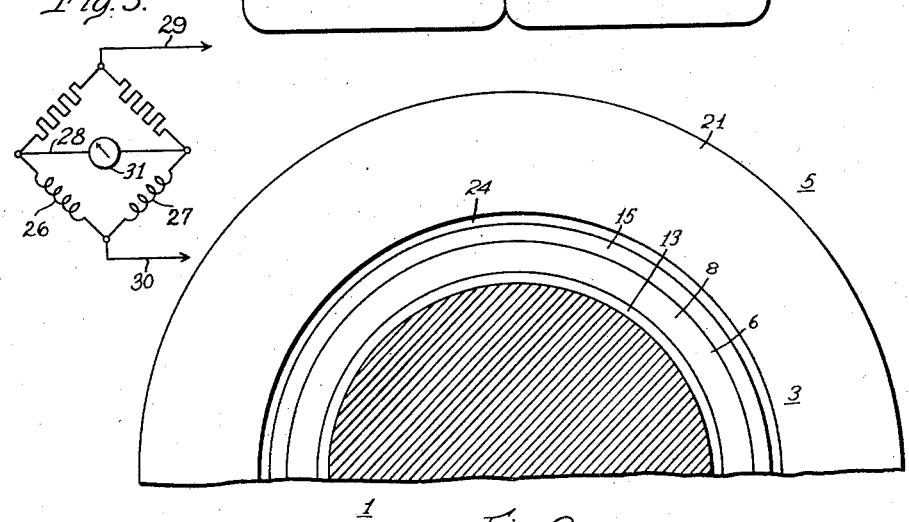
WITNESSES:
C. J. Weller.
O. F. Oberheim
INVENTOR
Aage M. Jacobsen.
BY
Paul E. Friedemann
ATTORNEY Patented Dec. 16, 1947

2,432,900

UNITED STATES PATENT OFFICE 2,432,900

ELECTRICAL DYNAMOMETER

Aage M. Jacobsen, Los Angeles, Calif., assignor to Westinghouse Electric Corporation, East Pittsburgh, Pa., a corporation of Pennsylvania Application November 1, 1944, Serial No. 561,467

8 Claims. (Cl. 73—136)

This invention relates, generally, to electromagnetic devices and more particularly to electromagnetic devices of the type useful in detecting mechanical strain.

This invention is related to the copending application of Frank W. Godsey, Jr., Serial No. 455,258, filed August 18, 1942, entitled "Power measuring device for rotating shafts," and to a copending application of Bernard F. Langer, and Frank W. Godsey, Jr., Serial No. 458,378, filed September 15, 1942, and entitled "Torque measuring device for shafts," both copending applications being assigned to the same assignee as this application. In certain of its aspects, this invention provides improvements over the devices disclosed in the above-mentioned copending applications. This invention is also related to Patent No. 2,349,653 assigned to the same assignee as this application.

Broadly stated, the present invention is an electromagnetic device comprising a stationary electromagnetic unit and a magnetic rotor assembly which is magnetically coupled to the stationary electromagnetic unit, the rotor member of which comprises a plurality of relatively displaceable magnetic elements which are linked by the magnetic flux circulating in the device and which are displaced relatively according to the shaft strain, to thus alter the distribution of the magnetic flux circulating in the device in an amount indicative of the shaft strain.

A principal object of the present invention is to provide a strain measuring device that will respond to selected strain characteristics of a shaft under load and produce an electrical quantity having simple proportionality to such strain characteristic.

Another object of the present invention is to provide a strain measuring device in which all the electrical windings are stationary.

Another object of the present invention is to provide a strain measuring device for a shaft which is of such mechanical design as to be self-compensating for relative changes of position of the component parts due to dimensional and electrical changes resulting from temperature changes, end thrust of the shaft and bending of the shaft, the torque loading of which is to be measured.

Another object of this invention is to provide a torque sensitive device that will respond to the slight circumferential or torsional deflections, that is, twist of small gauge lengths of shafts.

A further object of this invention is to provide a strain measuring device of compact construction that will be adaptable for use in relatively small spaces.

A specific object of this invention is to provide a strain measuring device for a rotatable shaft that may be calibrated statically.

A further specific object of the present invention is to provide a device for measuring the torsional deflection of a rotatable shaft, which device is of balanced construction that it may operate at high speeds without introducing vibration into the given shaft or shaft system.

Other objects and advantages will become apparent from a study of the following specification when considered in conjunction with the accompanying drawing, in which:

Figure 1 is a view partially in longitudinal section of an electromagnetic strain measuring device embodying the principles of this invention.

Fig. 2 is a view looking endwise of the device illustrated in Fig. 1, and

Fig. 3 is a diagrammatic illustration of a strain measuring unit embodying the strain sensitive device illustrated in Figs. 1 and 2.

Referring now to Figs. 1 and 2 of the drawing, the strain measuring device illustrated therein comprises, generally, a rotor assembly 3 which is firmly secured to rotate with the shaft 1 and a stator 5 which is concentrically disposed about the rotor assembly 3. The rotor assembly 3 comprises an annular member 6 which, as shown, is of single piece construction, but which may be fabricated or otherwise formed, for example, by die casting or machining in any suitable manner. This annular member 6 is preferably made of material which is nonmagnetic and has high electrical conductivity. It is provided with two axially displaced sections 7 and 8, and a central section 9. These sections are joined by the helically disposed members 10 and 11, the helical members 10 joining the axially displaced section 7 with the central section 9, and the helical members 11 joining the axially displaced section 8 with the central section 9. The members 10 are disposed in the left-hand screw direction, while the members 11 are disposed in the right-hand screw direction. Bushings 12 and 13 preferably of nonmagnetic material, disposed respectively between the sections 7 and 8 and the shaft 1, provide means for securing the annular torsion member 6 to the shaft so that it may be strained according to the straining movements of the shaft. Axially displaced rings 14 and 15 and a central ring 16 disposed therebetween, such that equal air gaps 17 and 18 are formed between the confronting faces of these ring elements, are respectively secured to the axially displaced sections 7 and 8 and the central section 9 of the annular member 6. With this arrangement it will be apparent that when counterclockwise torque is transmitted from left to right of the shaft, as viewed in Fig. 1, the helical members 10 are unwound while the helical members 11 are wound up. Thus an unbalanced force is exerted upon the central section 9 tending to move this section towards the right, as viewed in this figure, thereby decreasing the air gap 18 and increasing the air gap 17 to thus oppositely change the magnetic characteristics of these air gaps. Since the sections of the annular member 6, that is the sections 7 and 8 thereof, are firmly secured to the shaft, the only relative movement of these members which occurs, results from the slight axial shortening of the shaft 1 when it is strained in torsion. Such movement, however, equally affects both air gaps, thus no errors are introduced from this source. In a similar manner, temperature effects tending to produce changes in the physical dimensions of the parts, similarly affects all the parts of the assembly; thus any air gap changes which are produced are in the same direction and an unbalance of the air gap characteristics does not occur. Should the shaft be subjected to bending loads tending to deflect the shaft about its rotational axis, it will be apparent that the diametrically opposite portions of each air gap 17 and 18 will change in opposite directions because of the symmetrical arrangement of the magnetic ring elements 14, 15 and 16 and as follows the total magnetic reluctance of each air gap remains unchanged. If such bending loads are unsymmetrical with respect to the axis of the shaft, and each of the air gaps is thereby changed such that its total magnetic reluctance is no longer the same as for zero bending load, it will be apparent that both air gaps 17 and 18 will be changed in the same direction and, as a result, no unbalance of the magnetic characteristics of the air gaps will occur.

The stator or stationary member 5 comprises the magnetic housing 19 which is formed in two sections, a left-hand section 20 and a right-hand section 21. Each of these sections is preferably formed of sheet metal having good magnetic properties. However, they may be formed or fabricated in any suitable manner of magnetic material. The housing shown, however, is preferred since joints in the magnetic circuits which ordinarily tend to increase the reluctance of the path and increase the losses in the magnetic circuit are eliminated. Each housing section is provided with flanged extremities 22 which form peripheral surfaces concentrically disposed with respect to the peripheral surfaces of the magnetic shaft rings 14, 15 and 16 to thus form the circular air gaps 23, 24 and 25 which are stable in magnetic characteristic, whether the rotor is rotating or stationary. By that is meant the magnetic characteristics of the air gaps remains substantially unchanged from zero speed of the shaft to its maximum speed. Annular coils 26 and 27 are respectively disposed in the housing sections 20 and 21. The coils 26 and 27 are preferably connected in adjacent legs of a conventional Wheatstone bridge circuit 28 indicated in Fig. 3, in which the resistance and reactance components are balanced to produce an electrical balance of the bridge for zero torque of the shaft. Conductors 29 and 30 are the means through which preferably an alternating current is supplied to the bridge circuit, although any suitable uniformly varying electrical current may be utilized. An indicating instrument, such as 31, is connected across the output terminals of the electrical bridge circuit.

Upon energization of the bridge circuit with alternating current, flows of alternating magnetic flux may be induced in the magnetic circuit in the instantaneous directions indicated by the arrows in Fig. 1. The magnetic circuit for the coil 26 begins, for example, at the left-hand side of the housing 20 as viewed in Fig. 1, and includes the circular air gap 23, the magnetic ring 14, the air gap 17, a portion of the central ring 16, the central air gap 25 to the other side of the left-hand housing section. The magnetic circuit for the coil 27 may begin at the right-hand side of the housing 21 and includes the circular air gap 24, the magnetic ring 15, the air gap 18, a portion of the central ring 16, the central air gap 25 to the other side of the right-hand housing section 21. Thus it will be seen that each coil 26 and 27 has a circulating alternating magnetic flux linked therewith, and for zero torque of the shaft with the air gaps 17 and 18 having like magnetic characteristics, these alternating magnetic fluxes are substantially equal in value. Thus the coils 26 and 27, which are preferably identical, have like impedance characteristics. Hence, at zero torque of the shaft, the electrical properties of the coils are the same and the bridge circuit 28 is in a substantially electrically balanced condition.

Assuming now that torque is transmitted, as previously described, in a counterclockwise direction from left to right of the shaft, it will be apparent that the air gap 18 will be decreased and the air gap 17 increased, thus the magnetic flux linking the coil 27 is increased in density, and the magnetic flux linking the coil 26 is decreased in density. This, in effect, increases the impedance of the coil 27 and decreases the impedance of the coil 26 to substantially proportionally change the voltages across these coils. As a result, a differential voltage proportional to the voltage unbalance of the coils 26 and 27, appears across the output terminals of the bridge circuit and a scale deflection of the indicating instrument occurs indicative of this voltage unbalance.

The purpose of utilizing an annular torsion member, such as 6, which is made from metal of high electrical conductivity is primarily to provide an element which functions in effect as a single turn short-circuited winding. By providing such an element, any magnetic flux produced by the windings 26 and 27 tending to link the shaft, induces flows of alternating current in the torsion member. These flows of alternating current, in turn, produce a magnetic flux in the shaft in opposition to the main magnetic flux. By properly designing the annular torsion member 6, it is possible to obtain a magnetic flux which is substantially equal and opposite to the main magnetic flux to thus reduce the total magnetic flux in the shaft to zero. Thus any power losses resulting from eddy currents set up in the shaft are substantially eliminated and the energy level of operation of the device maintained at a substantially high value. In addition, magnetostrictive or elasto-resistive properties of the shaft, or both, and their resulting electrical effects, if not uniform throughout the gauge length of the shaft and which might produce a measurable electrical unbalance of the coils, are eliminated.

This invention provides an inherently compact strain measuring device which may be operated at rotational speeds which are limited only by the mechanical strength of the rotating elements. Since there are no delicate coil assemblies rotating with the shaft, these operating speeds may be considerably high. Further, the symmetrical annular construction of the rotor assembly provides an inherently balanced assembly which is substantially free of dynamic unbalance throughout the range of the rotational speeds of the shaft. Further, since all the rotating elements are magnetically coupled to the stationary coils, slip rings and brushes which are undesirable in such assemblies, both from electrical and mechanical points of view, are eliminated.

The foregoing disclosure and the showings made in the drawing are merely illustrative of the principles of this invention and are not to be considered in a limiting sense; the only limitations are to be determined from the scope of the appended claims.

I claim as my invention:

1. In a magnetic device, the combination of, a stationary electromagnetic member, a rotor member, said rotor member including a pair of axially displaced rings and a central ring disposed therebetween such that small axial air gaps are formed between the confronting transverse faces of said rings, said rings being formed of magnetic material and being disposed with respect to said stationary member such that air gaps of constant magnetic characteristic are formed therebetween, and means of nonmagnetic material including three axially displaced sections joined by oppositely disposed helices, mechanically connected to said axially displaced rings at said sections.

2. In a magnetic device, the combination of, a stationary electromagnetic member, a rotor member, said rotor member including three axially displaced rings and a central ring disposed therebetween such that small axial air gaps are formed between the confronting transverse faces of said rings, said rings being formed of magnetic material and being disposed with respect to said stationary electromagnetic member such that air gaps of constant magnetic characteristic are formed therebetween, a member of nonmagnetic material having two axially displaced sections and a central section, a plurality of members having the configuration of a right-hand helix joining one of said axially displaced sections and said central section, a plurality of members having the configuration of a left-hand helix joining the other of said axially displaced sections and said central section, said axially displaced sections and the central section being each secured to one of said rings.

3. An electromagnetic device comprising, in combination, a stationary member of magnetic material, electrical coil means associated with said stationary member, a plurality of ring-like elements of magnetic material which are so axially disposed that small axial air gaps are formed between the confronting transverse faces thereof, said ring-like elements being disposed with respect to said stationary member such that air gaps of constant magnetic characteristic are formed therebetween, and means of non-magnetic material comprising right- and left-hand helical sections, joining said ring-like elements, such that cooperating elements forming one axial air gap are joined by a section having a right-hand helix and cooperating elements forming another axial air gap are joined by a section having a left-hand helix.

4. An electromagnetic device comprising, in combination, an annular stationary member of magnetic material, annular coils associated with the stationary member, a rotor member, a pair of axially displaced rings forming a part of the rotor member and a central ring disposed between the axially displaced rings such that small axial air gaps are formed between the confronting transverse faces thereof, said rings being formed of magnetic material and being concentrically disposed with respect to the stationary member such that circular air gaps of constant magnetic characteristic are formed therebetween, a member of nonmagnetic material having two axially displaced sections and a central section disposed therebetween, a plurality of members having the configuration of a right-hand helix joining one axially displaced section and the central section, a plurality of members having the configuration of a left-hand helix joining the other axially displaced section and the central section, said axially displaced sections and the central section being each secured to one of said rings.

5. An electromagnetic device comprising, in combination, an annular stationary member of magnetic material having transversely disposed annular sections centrally thereof and at its axial extremities such that peripheral surfaces are formed at the central and axial extremities whereby said stationary member is divided into two axially displaced sections, an annular magnetizing coil associated with each of said sections, a rotor member comprising a pair of axially displaced ring-like elements and a central ring disposed therebetween such that small axial air gaps are formed between the confronting transverse faces of said rings, said axially displaced rings being formed of magnetic material, said axially displaced rings being concentrically disposed with respect to said annular sections at the extremities of said stationary member and said central ring being concentrically disposed with respect to the central annular sections of said stationary member such that small circular air gaps are formed therebetween, an annular member of nonmagnetic material having good electrical conductivity comprising two axially displaced annular sections and a central annular section, a plurality of members having the configuration of a right-hand helix joining one of said axially displaced sections and said central section, a plurality of members having the configuration of a left-hand helix joining the other of said axial sections and said central section, said axially displaced sections and said central section being respectively secured to the axially displaced rings and the central ring.

6. In a magnetic device, the combination of, a stationary member of magnetic material, a rotor member of magnetic material, said rotor member being disposed with respect to said stationary member such that airgaps of constant magnetic characteristic are formed therebetween whether the rotor is rotating or stationary, means for producing a magnetic flux linking both of said members across said airgaps, a plurality of axially displaced elements of magnetic material arranged to form small axial airgaps therebetween, said elements forming a part of said rotor member and being linked by said magnetic flux, a sleeve of non-magnetic material including a plurality of axially displaced sections corresponding in number and in axial spacing to said axially displaced sections, means forming oppositely disposed helices mechanically interconnecting the consecutive axially displaced sections so that the application of torque to said sleeve unwinds one helix as the other is wound causing relative axial movement of said sections, and means mechanically connecting said sleeve with said axially displaced elements at each of the axially displaced sections thereof to effect movement of the respective elements with the section to which each is connected.

7. In a magnetic device, the combination of, a stationary member of magnetic material, a rotor member of magnetic material, said rotor member being disposed with respect to said stationary member such that airgaps of constant magnetic characteristic are formed therebetween whether the rotor member is rotating or stationary, means for producing a magnetic flux linking said members across said airgaps, at least two axially displaced elements of magnetic material arranged with the axially confronting faces thereof in proximity to form an axial airgap therebetween, said elements forming a part of said rotor member and being linked by said magnetic flux, a sleeve of non-magnetic material comprised of at least two axially displaced sections joined by helices disposed in the same helical direction, said sleeve being joined to said elements at said sections.

8. Apparatus for determining the torque of a shaft comprising, in combination, a stationary member of magnetic material, magnetizing coils supported by the stationary member, a rotor member, a plurality of ring-shaped elements of magnetic material forming a part of the rotor member and disposed such that small axial airgaps are formed between the confronting extremities thereof, said elements being disposed with respect to the stationary member so that airgaps of constant magnetic characteristic are formed therebetween whether the rotor is rotating or stationary, a sleeve of non-magnetic material comprising a plurality of axially displaced sections each connected to one of said plurality of elements to support the element, means forming oppositely disposed helices mechanically interconnecting the consecutive axially displaced sections so that the application of torque to said sleeve unwinds one helix as the other is wound causing relative axial movement of said sections, means mechanically connecting said sleeve with said axially displaced elements at each of the axially displaced sections thereof to effect movement of the respective elements with the section to which each is connected, said sleeve being constructed and arranged to be supported on said shaft to have applied thereto a torque loading corresponding to shaft torque, means for supplying alternating current to said magnetizing coils, and means responsive to electrical changes of said coils.

AAGE M. JACOBSEN.

REFERENCES CITED

The following references are of record in the file of this patent:

UNITED STATES PATENTS

| Number | Name | Date |
| --- | --- | --- |
| 2,365,565 | Langer | Dec. 19, 1944 |
| 2,260,036 | Kuehni | Oct. 21, 1941 |